May 5, 1959      H. H. ENSLEY      2,885,206

TOY HELICOPTER

Filed June 23, 1958

HORTON H. ENSLEY,
INVENTOR.

BY William C. Babcock
ATTORNEY.

tates Patent Office 2,885,206
Patented May 5, 1959

2,885,206

TOY HELICOPTER

Horton H. Ensley, Manhattan Beach, Calif.

Application June 23, 1958, Serial No. 743,578

2 Claims. (Cl. 272—31)

This invention relates to toys, and more particularly to electrical motor-driven helicopters.

The principal object of this invention is to improve propeller-driven helicopter toys by mounting the flight boom thereof in such a manner that unaided helicopter flight is accomplished by manual operation and synchronization of the control means associated therewith.

Another object of the invention is to provide an improved propeller-driven toy helicopter which has the electric motor mounted in a fixed position on a rotatable base that is so associated with the pivotal flight boom as to provide unaided helicopter flight.

Toys of this general character are known commercially and disclosed in the prior art, but they all fail structurally and operationally in that they do not simulate actual free helicopter flight. All of these toys, including applicant's, require a rotatable flight boom for power and control, but the present device is the only one which initiates helicopter flight from an unaided position and thereafter maintains free flight by skillful manual operation of synchronizable dual control mechanism.

Still another object of the present invention is to provide a dual controlled electrically-driven helicopter which requires skill alone to initiate unaided flight and to maintain controlled free flight.

These and other objects and advantages of the invention will become apparent from the following description of a preferred form thereof, and from the accompanying drawing illustrating same in which.

Figure 3:
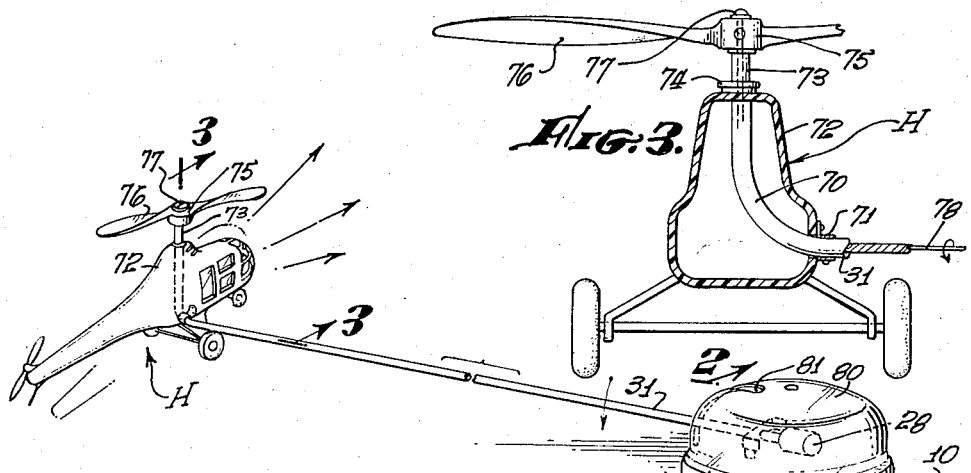
Figure 3 is a section taken on line 3—3 of Figure 1.
Figure 1:
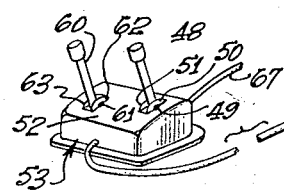
Figure 1 is a perspective view of the device in operative position.

This preferred embodiment of the present invention comprises a circular stationary platform 10 having a central, depending open bore 11 formed therein. Dual concentric conduction or collector rings 12 and 13 attached in an electrically insulated manner to the flat top 14 of platform 10, and in connection with insulated grommets 15 and 16, respectively, provide means for supplying electrical current to a driving mechanism that will hereinafter be described. A circular base plate or turntable 17, preferably formed of a polymerized resin material, has a depending cylindrical boss 18 which is rotatably received in bore 11. Base 17 and boss 18 have a joined offset portion 19 that slightly elevates base plate 17 above the top 14 of platform 10. Either molded with, or formed as a part thereof, are dual apertured housings 20 and 21 which support dual electric contact plungers 22 and 23, respectively. Plungers 22 and 23 are held in a tensioned, contact position against conduction rings 12 and 13 by means of dual coil springs 24 and 25, respectively. Connections 26 and 27 complete the electrical circuit to an electrical motor 28, which is bolted or welded at 29 to a supporting bracket 30 that in turn is either formed as an integral part thereof or bolted to base 17.

Figure 2:
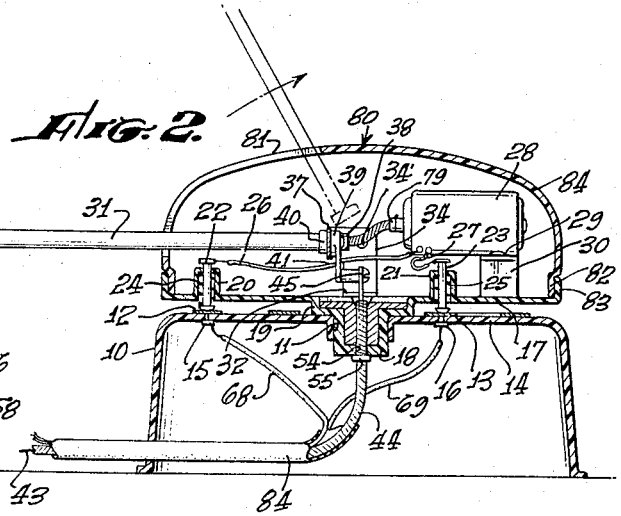
Figure 2 is a sectional view of the driving mechanism, taken on line 2—2 of Figure 1, as well as an enlarged vertical section of the control box.
Figure 4:
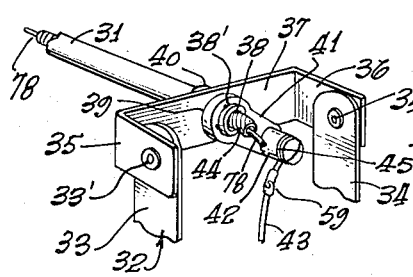
Figure 4 is an enlarged partial perspective of the flight boom end pivotal mounting.

The inner end of a hollow flight boom 31 formed of a light, but sturdy metal such as an aluminum alloy or the like, is pivotally mounted on base plate 17 to permit the desired degree of vertical elevation, as best shown in Figure 2. A U-shaped bracket 32 which is either integrally molded with, or bolted to rotatable base plate 17, has upwardly projecting spaced ears 33 and 34 that are pivotally connected at 33' and 34', respectively, to the spaced arms 35 and 36, respectively, of a U-shaped supporting bracket 37 provided on boom 31, as shown in Figure 4. The inner end 38 of flight boom 31 passes through a fitted opening in bracket 37 and is splined or welded at 38' to a specially formed bracket that engages collar 39. A second fixed collar 40 which is pressed or welded on boom 31, engages the opposite face of bracket 37 to thereby provide positive, rugged pivotal positioning of flight boom 31 on rotatable plate 17, yet still permit circumferential movement of boom 31 in bracket 37.

The specially formed collar 39 is actually a lever mechanism for imparting circumferential movement to the flight boom 31 in either direction, so as to oscillate the aircraft, and a lever arm 41 is integrally formed therewith as well as a longitudinally disposed actuating lever arm 42. Means for actuating the lever mechanism and imparting slight movement to flight boom 31 in either direction about its longitudinal axis is provided by the conventional Bowden cable mechanism, including a flexible wire or cable 43 and coil wire housing 44. Cable or wire 43 is made fast at 45 to the actuating lever arm 42, with the remote outer end thereof being secured at 46 to the lower end 47 of a manually operable control lever 48. Lever 48 is pivotally mounted at 49, as shown in Figure 2, in upstanding dual ears 50 and 51 upset from the upper face 52 of a control box 53. The coil wire housing 44 and enclosed wire 43 pass through an opening 54 in boss 18, the housing 44 having a fixed collar 55 formed thereon abutting against the lower surface of said boss 18 and supporting the lever actuating wire 43 and housing 44 in the position shown in Figure 2. The outer remote end of coil wire housing 44 passes through an opening 56 in the control box 53 and is fixedly held in position by means of a clamp 57 secured to the interior of the control box 53 at 58. A Bowden connection or swivel 59 is shown in Figure 4 immediately adjacent the connection 45 previously described.

Manual operation of the control lever 48 obviously imparts movement from a remote position to the flight boom 31 in the direction desired.

A second manually operable control handle 60 is similarly pivotally affixed at 61 to opposed dual ears 62 and 63 on the upper face 52 of control box 53, and the lower end of handle 60 engages at 64 a lever 65, which in turn is connected to a conventional rheostat 66. Current is introduced to rheostat 66 by means of a standard electrical connection 67, and controlled electric current is transmitted from rheostat 66 to the electric motor through dual wires 68 and 69 which are connected to the previously described concentric conductor rings 12 and 13 respectively. It will be obvious that manual operation of control lever 60 controls the speed of the electric motor by actuation of the rheostat.

The outer end of flight boom 31 is curved or bent upwardly at 70, as best shown in Figure 3. This curved end of boom 31 is fixedly secured in a toy helicopter device H which may conform to any desired design. Boom portion 70 is grommeted or clamped securely at 71 in the lower inner side of the helicopter fuselage 72, and the upper vertical end portion 73 of boom 31 passes through, and is supported in a fitting 74 pressed into the top of the fuselage. The vertical end portion 73 of flight boom 31 projects substantially above the toy helicopter and provides a surface upon which a washered hub 75 of the helicopter blade or propeller 76 can rotate. Propeller 76 is fixedly secured by threaded engagement 77, or clamped or welded in any manner desired to the outer attachment end of flexible driving cable 78 carried in flight boom 31. The inner end of the driving cable 78 projects beyond the inner end of flight boom 31, and is attached to the drive shaft of the electric motor at 79.

It will be noted that the pivotal mounting and flexible motor connection described above will permit free vertical unaided movement of the flight boom 31. Boom 31 is not counterbalanced in any way to assist in the free flying characteristics of the toy helicopter device or the synchronizable control thereof. A domed member 80 is slotted at 81 to permit vertical pivotal movement of the flight boom 31. The circular edge 82 of member 80 is fashioned for releasable clamping connection with the inside of an upstanding rim 83 integrally molded with base plate 17. A thin plastic cover 84 may be used to house the motor and boom control wire and cable elements 68, 69 and 44 respectively.

The present device requires manual remote manipulation of control levers 60 and 48 beyond the operating range of boom 31 and attached toy helicopter H. The device can, of course, be made to taxi about the platform 10, but initiation of helicopter flight from an obviously unaided and non-counter-balanced position is accomplished by manually increased revolutions of the propeller until the toy helicopter is airborne. Simultaneous skillful manipulation of the tilted position of the helicopter is also required in order to maintain free flight and the direction of movement around the stationary platform.

In other words, by manipulation of control lever 60 the operator has propeller control and at the same time, careful and skillful actuation of lever 48 will result not only in maintenance of free flight but will avoid a crash. However, just slight circumferential movement of the flight boom will tilt the helicopter downward for forward flight, and rearward for reverse flight. Absolute synchronization of the dual controls is required, but constant practice increases the operator's skill and thus enhances the excitement of maintaining free helicopter flight and simulating actual free flight conditions.

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. A toy including a base, a turntable supported on said base and rotatable solely in a horizontal plane, a prime mover mounted on said turntable, a flight boom, one end of said flight boom having affixed thereto a miniature aircraft, a propeller rotatably supported from said aircraft, a flexible drive shaft extending from said prime mover to said propeller, remote control means connected to said prime mover to regulate the speed thereof, the other end of said flight boom being pivotally mounted at the extremity thereof upon said turntable so as to freely move up and down in a vertical direction, said flight boom also being mounted on said turntable for rotation about its longitudinal axis so as to oscillate said aircraft, and remote control means connected to said other end of said flight boom to regulate the oscillation thereof.

2. A toy as set forth in claim 1, said flexible drive shaft extending through such pivotal connection of the flight boom and turntable and also through such oscillatable mounting and then through said flight boom to said propeller.

References Cited in the file of this patent

UNITED STATES PATENTS

| | | |
|---|---|---|
| 1,748,421 | Leach | Feb. 25, 1930 |
| 1,980,391 | Eslinger | Nov. 13, 1934 |
| 2,451,006 | West | Oct. 12, 1948 |
| 2,779,595 | Ensley | Jan. 29, 1957 |